United States Patent
Dahlen et al.

(10) Patent No.: US 8,165,587 B2
(45) Date of Patent: Apr. 24, 2012

(54) COMMUNICATING CELL RESTRICTION STATUS INFORMATION BETWEEN RADIO ACCESS NETWORK NODES

(75) Inventors: Anders Dahlen, Vasterhaninge (SE); Mats Buchmayer, Stockholm (SE); Martin Israelsson, Spanga (SE); Mattias Wahlqvist, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 118 days.

(21) Appl. No.: 12/866,315

(22) PCT Filed: Feb. 7, 2008

(86) PCT No.: PCT/SE2008/050149
§ 371 (c)(1), (2), (4) Date: Aug. 5, 2010

(87) PCT Pub. No.: WO2009/099356
PCT Pub. Date: Aug. 13, 2009

(65) Prior Publication Data
US 2010/0323662 A1    Dec. 23, 2010

(51) Int. Cl.
*H04W 36/00* (2009.01)
(52) U.S. Cl. ......... 455/439; 455/438; 455/436; 370/331
(58) Field of Classification Search ............... 455/432.1, 455/432.3, 433, 434, 435.1, 435.2, 435.3, 455/436, 438, 439, 442, 410, 411; 370/331, 370/329
See application file for complete search history.

(56) References Cited

U.S. PATENT DOCUMENTS

| | | | | |
|---|---|---|---|---|
| 6,438,375 | B1 * | 8/2002 | Muller | 455/435.3 |
| 7,957,739 | B2 * | 6/2011 | Jeong et al. | 455/436 |
| 2002/0123348 | A1 | 9/2002 | Willars et al. | |
| 2003/0139182 | A1 | 7/2003 | Bakkeby et al. | 455/432 |
| 2006/0121935 | A1 * | 6/2006 | Dalsgaard et al. | 455/552.1 |
| 2006/0166694 | A1 * | 7/2006 | Jeong et al. | 455/525 |
| 2007/0086387 | A1 * | 4/2007 | Kang et al. | 370/331 |
| 2007/0291695 | A1 * | 12/2007 | Sammour et al. | 370/331 |
| 2008/0233963 | A1 * | 9/2008 | Alanara et al. | 455/438 |
| 2008/0268854 | A1 * | 10/2008 | Cai et al. | 455/444 |
| 2009/0104905 | A1 * | 4/2009 | DiGirolamo et al. | 455/434 |
| 2009/0197631 | A1 * | 8/2009 | Palanki et al. | 455/522 |

(Continued)

FOREIGN PATENT DOCUMENTS
GB    2353438    2/2001
(Continued)

*Primary Examiner* — Jean Gelin
(74) *Attorney, Agent, or Firm* — Coats & Bennett, P.L.L.C.

(57) ABSTRACT

A cellular radio communications network includes a core network coupled to a radio access network (RAN) that has multiple RAN nodes for communication with mobile radio terminals. Each of the multiple RAN nodes serves one or more cells. At least one cell associated with a first RAN node is in a restricted or reserved access state in which access to the one cell is restricted for at least some mobile radio terminals. The first RAN node sends a message to a second RAN node to inform the second RAN node of that restricted access cell. The fact that the restricted status of the one cell has changed is detected. A global message tha is not related to a specific mobile terminal is generated that includes information that the restricted status of the one cell has changed. The first RAN node sends the global message to the second RAN node to inform the second RAN node of the change in the restricted status of the one cell.

20 Claims, 8 Drawing Sheets

U.S. PATENT DOCUMENTS

| | | | |
|---|---|---|---|
| 2009/0253435 A1* | 10/2009 | Olofsson et al. | 455/450 |
| 2010/0039948 A1* | 2/2010 | Agrawal et al. | 370/252 |
| 2010/0240356 A1* | 9/2010 | Lee et al. | 455/422.1 |
| 2010/0240397 A1* | 9/2010 | Buchmayer et al. | 455/456.1 |
| 2010/0265896 A1* | 10/2010 | Park et al. | 370/329 |
| 2010/0329150 A1* | 12/2010 | Nielsen | 370/254 |
| 2011/0117916 A1* | 5/2011 | Dahlen | 455/436 |

FOREIGN PATENT DOCUMENTS

| | | |
|---|---|---|
| WO | 98/37722 | 8/1998 |
| WO | 2007/043932 A1 | 4/2007 |

* cited by examiner

COMMUNICATING CELL RESTRICTION STATUS INFORMATION BETWEEN RADIO ACCESS NETWORK NODES

TECHNICAL FIELD

The technical field relates to a mobile radio communications system and restricted cells where one or more mobiles are restricted in access to service.

BACKGROUND

Universal Mobile Telecommunications System (UMTS) is an example of a mobile radio communications system. UMTS is a 3rd Generation (3G) mobile communication system employing Wideband Code Division Multiple Access (WCDMA) technology standardized within the $3^{rd}$ Generation Partnership Project (3GPP). In the 3GPP release 99, the radio network controller (RNC) in the radio access network controls radio resources and user mobility. Resource control includes admission control, congestion control, and channel switching which corresponds to changing the data rate of a connection. Base stations, called node Bs (NBs), which are connected to an RNC, orchestrate radio communications with mobile radio stations over an air interface. The RNC controls what system information the Node B should broadcast and is the control plane protocol termination point towards the user equipments (UEs). RNCs are also connected to nodes in a core network. i.e., Serving GPRS Support Node (SGSN), Gateway GPRS Support Node (GGSN), mobile switching center (MSC), etc. Core network nodes provide various services to mobile radio users who are connected by the radio access network such as authentication, call routing, charging, service invocation, and access to other networks like the Internet, public switched telephone network (PSTN), Integrated Services Digital Network (ISDN), etc.

Figure 1:
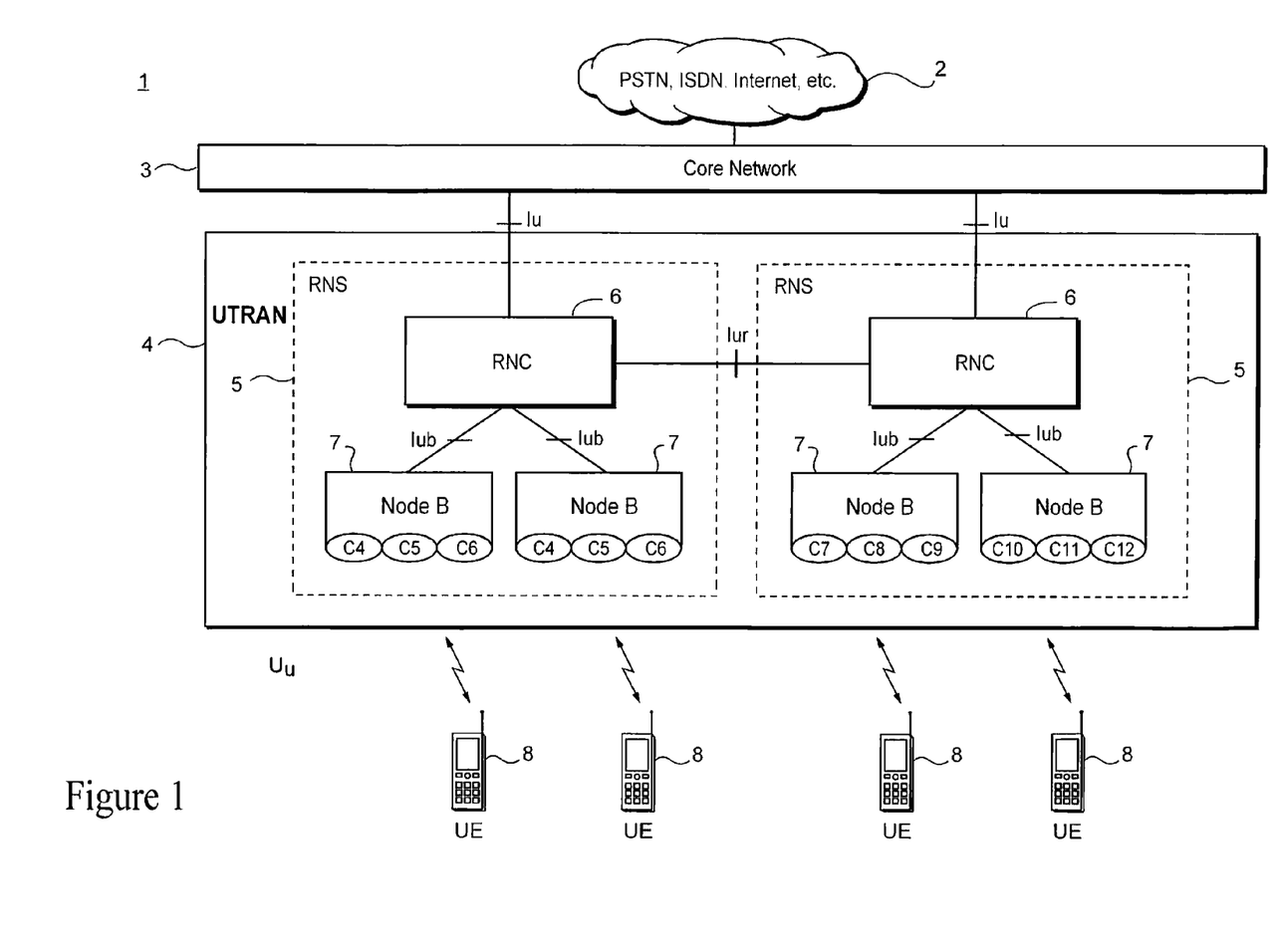
FIG. 1 is a function block diagram of an example UMTS mobile radio communication system.

FIG. 1 illustrates an example UMTS system 1 in which UMTS Terrestrial Radio Access Network (UTRAN) 4 is coupled to a core network 3 via an Iu interface and communicates over an air Uu interface with mobile terminals called user equipments (UEs) 8. The core network includes core network nodes like mobile switching centers (MSCs) and Serving GPRS Support Nodes (SGSNs) that interface with other networks the Internet, public switched telephone network (PSTN), Integrated Services Digital Network (ISDN), etc. 2. The UTRAN 4 includes radio network systems (RNSs) 5 that each include an RNC 6 coupled to one or more Node B base stations 7 over an Iub interface. Different RNCs 6 communicate information over and Iur interface. Each Node B 7 coordinates coverage and communication in one or more cells. In the example, each Node B is associated with three cells. From the UE's point of view, an RNC may be a Serving RNC that terminates the UE's link layer communications. From the core network point of view, the Serving RNC terminates the Iu interface for this UE. The Serving RNC also exerts admission control for new mobiles or services attempting to use the core network over its Iu interface. Admission control ensures that UEs are only allocated radio resources (e.g., bandwidth and signal/noise ratio) up to what the network has available. An RNC can be a Drift RNC, where the UE's physical layer communications terminate in a soft handover situation where the UE has moved from a cell associate with the serving RNC and moved to a cell associated with another, drift RNC. The Drift RNC communicates with the Serving RNC via the Iur interface.

The Long Term Evolution (LTE) of UMTS is under development by the 3rd Generation Partnership Project (3GPP) which standardizes UMTS. There are many technical specifications hosted at the 3GPP website relating to Evolved Universal Terrestrial Radio Access (E-UTRA) and Evolved Universal Terrestrial Radio Access Network (E-UTRAN), e.g., 3GPP TS 36.300. The objective of the LTE standardization work is to develop a framework for the evolution of the 3GPP radio-access technology towards a high-data-rate, low-latency and packet-optimized radio-access technology. In particular, LTE aims to support services provided from the packet switched (PS)-domain. A key goal of the 3GPP LTE technology is to enable high-speed packet communications at or above about 100 Mbps.

Figure 2:
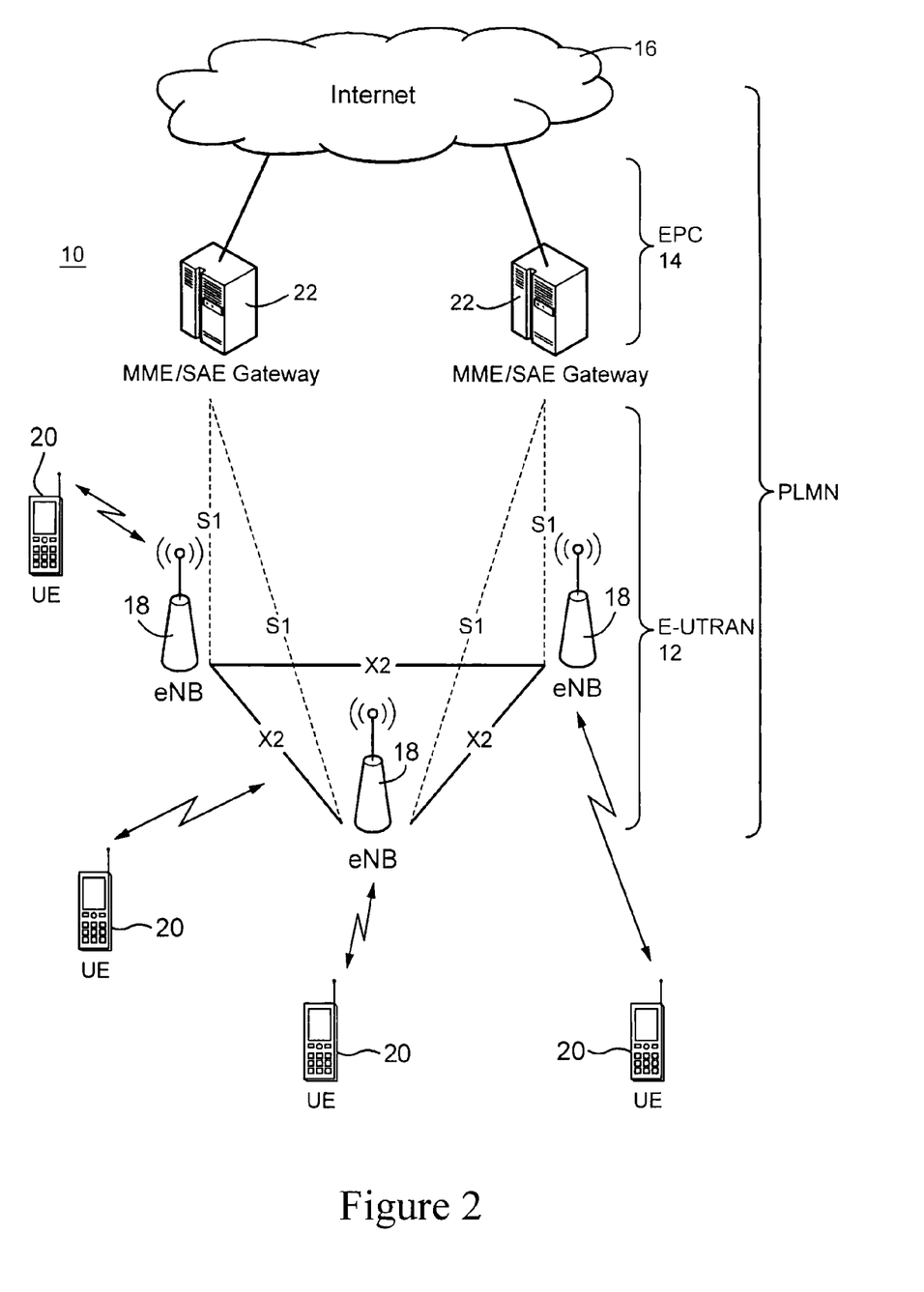
FIG. 2 is a function block diagram of an example LTE mobile radio communication system.

FIG. 2 illustrates an example of an LTE type mobile communications system 10. An E-UTRAN 12 includes E-UTRAN NodeBs (eNBs) 18 that provide E-UTRA user plane and control plane protocol terminations towards the user equipment (UE) terminals 20 over a radio interface. The eNB controls radio resources and user mobility. An eNB is sometimes more generally referred to as a base station, and a UE is sometimes referred to as a mobile radio terminal or a mobile station. As shown in FIG. 2, the base stations are interconnected with each other by an X2 interface. The base stations are also connected by an S1 interface to an Evolved Packet Core (EPC) 14 which includes a Mobility Management Entity (MME) and to a System Architecture Evolution (SAE) Gateway. The MME/SAE Gateway is shown as a single node 22 in this example and is analogous in many ways to an SGSN/GGSN gateway in UMTS and in GSM/EDGE. The S1 interface supports a many-to-many relation between MMEs/SAE Gateways and eNBs. The E-UTRAN 12 and EPC 14 together form a Public Land Mobile Network (PLMN). The MMEs/SAE Gateways 22 are connected to directly or indirectly to the Internet 16 and to other networks.

A cellular network operator sometimes needs to restrict access by UEs to one or more cells in its network. There are three categories of restrictions including barring a cell, reserving a cell for operator use, and reserving a cell for use by only UEs having certain "access classes". A barred cell is a cell that a UE is not allowed to camp on. A reserved cell is a cell on which camping is not allowed, except for particular UEs, if so indicated in the system information. A restricted cell is a cell on which camping is allowed, but access attempts are disallowed for UEs whose associated access classes are indicated as barred. In all of these cases, the cell is considered restricted in some way.

A significant problem created with restricted cells is how to communicate to other RAN nodes, e.g., eNBs in an LTE system, that such a cell has changed its restriction status and that access to that cell for handovers, new connections, etc. is now available. One possible solution to this problem is to wait for a UE-specific message to be generated relating to the once restricted cell and include information in that UE-specific message indicating that the restricted cell is no longer restricted. But the disadvantage in this approach is that there may elapse significant time before such a UE-specific message is generated causing undesirable delay in that newly-unrestricted cell providing service. Moreover, there may be situations where because of cell restrictions, UE-specific handover messages are not allowed between the involved eNBs, which means that the restrictions might not even be lifted using UE-specific messages, requiring some sort of manual intervention by the operator.

On the other side of this issue is the related problem of promptly informing other eNBs of the restricted state of cell. In that case, unnecessary handover attempts may be made to the restricted cell that fail leading potentially to dropped connections. It also leads to higher signaling because another target cell must be selected for handover after the handover attempt fails and a new handover request is made towards this new target cell.

Another problem with UMTS and LTE systems is insufficient use of Access Control to prevent selected classes of UEs from sending initial access messages to restricted cells. At a user subscription, one or more Access Classes are allocated to the subscriber's UE and stored in the UE's Subscriber Identity Module (SIM). This access class information has the potential to be very useful to informing radio access nodes, like RNCs in UMTS and eNBs in LTE, about the cell restriction status of a large number of UEs. But so far that access class information is not systematically and efficiently provided to those radio access nodes.

It would also be desirable for LTE and UMTS networks to be able to use access class information to steer handovers towards the most appropriate frequency or Radio Access Technology (RAT) to assure that the UE receives good service in the target handover cell. To enable the network to steer handovers based on UE access class and access restriction in neighbor cells, the access class of the UE must be provided from the old serving RAN node to the new serving RAN node whenever there is a change of serving RAN node for a UE in an active state. In LTE, this means forwarding the access class at handover, and in UMTS, at Serving RNC (SRNC) relocation.

Depending on the cell restriction status emergency calls may or may not be allowed in the cell. An area restriction concept would restrict idle and active state UE access in tracking and location areas or even in PLMNs and entire RATs. A UE is only allowed to perform emergency calls in these areas or networks. But these areas are rather large, and sometimes it would be desirable to have the ability to restrict every thing except emergency calls on an individual cell level. Unfortunately, there is a lack of knowledge in a new serving RAN node whether a radio bearer is available for a particular UE's emergency call in a cell controlled by that new serving RAN node after changing from the old serving RAN node to the new serving RAN node.

SUMMARY

A cellular radio communications network includes a core network coupled to a radio access network (RAN) that has multiple RAN nodes for communicating with mobile radio terminals. Each RAN node serves one or more cells. At least one cell associated with a first RAN node is in a restricted or reserved access state in which access to the one cell is restricted for at least some mobile radio terminals. The first RAN node sends a message to a second RAN node to inform the second RAN node of that restricted access cell. The fact that the restricted status of the one cell has changed is detected. A global message that is not related to a specific mobile terminal is generated that includes information that the restricted status of the one cell has changed. The first RAN node sends the global message to the second RAN node to inform the second RAN node of the change in the restricted status of the one cell.

Other features of the technology in this case are now described. Upon detecting that access in the at least one cell is to be restricted, the first RAN node may send a global message to the other RAN node to inform the other RAN node of the restricted status of the one cell.

At least some mobile radio terminals preferably have an access class associated with accessing service via one or more cells in the cellular radio communications network. The RAN node receives and stores from at least one other RAN node information indicating the access class for at least one of the mobile radio terminals. The RAN node may use the access class information in determining what cell or cells are available for access and handover of a connection involving one of the mobile radio terminals.

For a handover of a connection involving one of the at least some mobile radio terminals, a source RAN node for the connection may forward to a target RAN node for the connection information indicating the access class of the mobile radio terminal involved in the connection. A source RAN node for the connection may also forward to a target RAN node for the connection information indicating whether the connection is an emergency call. The first RAN node may further use access class status information to steer handover of a connection involving one of the mobile radio terminals to a handover target cell that uses a radio access technology different than the radio access technology used in a handover source cell. Similarly, the first RAN node may further use access class status information to steer an idle mobile radio terminal to camp on a cell based on an access class of the idle mobile radio terminal.

Although applicable to any modern cellular communications system, in one example embodiment, the cellular radio communications network is an LTE type network and the first and second RAN nodes are eNBs. In another example embodiment, the cellular radio communications network is a UMTS type network and the first and second RAN nodes are RNCs.

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail.

It will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be embodied in computer readable medium and so executed by a computer or processor, whether or not such computer or processor is explicitly shown. The functions of the various elements including functional blocks may be provided through the use of dedicated electronic hardware as well as electronic circuitry capable of executing computer program instructions in association with appropriate software.

It will be apparent to one skilled in the art that other embodiments may be practiced apart from the specific details disclosed below. All statements reciting principles, aspects, and embodiments, as well as specific examples, are intended to encompass both structural and functional equivalents. Such equivalents include both currently known equivalents as well as equivalents developed in the future, i.e., any elements developed that perform the same function, regardless of structure.

Figure 3:
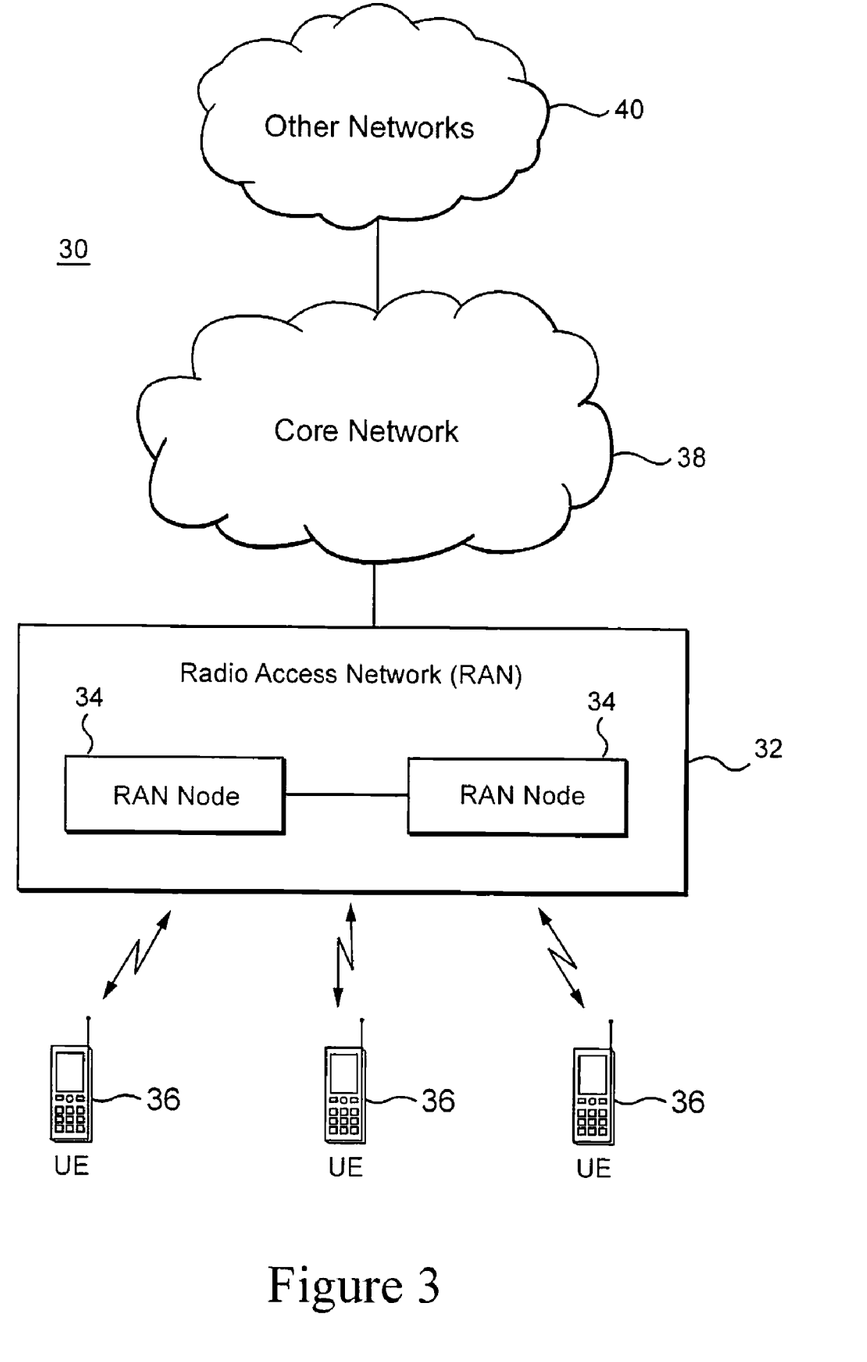
FIG. 3 is a function block diagram of a general mobile communications system.

LTE has a "flat architecture" where there are many more eNBs than there are RNCs in WCDMA networks. For illustration purposes only, many of the examples below are provided in an LTE context. However, this problem also exists in "flat" WCDMA networks with RNC and NodeB collapsed nodes. Although well-suited for flat architecture situations in WCDMA and LTE, this technology may also be used in any modern cellular communications system that can support cell restriction status and access class messaging between RAN nodes. One non-limiting example of a general cellular communications system 30 is shown FIG. 3. A radio access network (RAN) 32 is coupled to a core network 38 that includes one or more core network nodes not shown. The core network is coupled to one or more other networks 40 like the Internet. The RAN 32 includes RAN nodes 34 that communicate with each other. e.g. for handover and other coordinated functions. The RAN nodes 34 are either base stations or communicate with base stations. The base stations communicate over the radio/air interface with mobile radio terminals also referred to as user equipment terminals (UEs) 36.

A UE's access class is stored on a Subscriber Identity Module (SIM) card included in the UE and preconfigured before given to the UE customer. An example set of UE access classes might be:

| Access Class | Operation |
| --- | --- |
| Class 0-9 | Cell access restriction IE for General Use |
| Class 10 | Indication of availability for emergency call from UE with access class 0 to 9 |

-continued

| Access Class | Operation |
| --- | --- |
| Class 11 | Cell access restriction IE for PLMN Use |
| Class 12 | Cell access restriction IE for Security Services |
| Class 13 | Cell access restriction IE for Public Utilities (e.g. water/gas suppliers) |
| Class 14 | Cell access restriction IE for Emergency Services |
| Class 15 | Cell access restriction IE for PLMN Staff |

When a UE wants to attach to a cellular network, it sends a message to the base station that serves the cell in which the UE is located. That base station sends the attach message to the appropriate node in the network where the UE is registered. In the attach message, the UE preferably also includes the UE's access class obtained from its SIM card. As part of the network attachment and the registration, the radio access network receives and stores a UE context that includes the UE's access class. In a special case where a UE is requesting an emergency call, the attach message preferably includes an indication that the request relates to an emergency call. The RAN node then stores this emergency call information in a bearer context, which may or may not be a part of the UE context. The bearer context typically includes a bearer identity and quality of service parameters for the bearer. By also storing the emergency call information in the bearer context, rather than in the UE context, it is possible to determine which bearer is for emergency call (and which bearer(s) is(are) not) when a UE has several bearers during an emergency call. This allows an emergency call to continue even if other not-allowed bearers are dropped.

Also, as explained in the background, there are problems associated with a flat RAN architecture because each RAN node do not know the current restricted state of cells associated with other RAN nodes. Some of these problems are highlighted in the following LTE example with reference being made to the function block diagram in FIG. 4. The RAN node in this instance is an E-UTRAN node B (eNB) 18. The eNBs communicate via an X2 interface. Each of the eNBs 18 coordinates communication with three cells: The first eNB coordinates cells C1, C2, and C3, and the second eNB2 coordinates cells C4, C5 and C6. Assume that cell C3 is a neighboring cell to cells C4 and C5 and that there are three active UEs in cell C3. The eNB1 stores the UE contexts for the three active UEs which include, as explained above, the access class that each UE belongs to. For purposes of this example, assume that UE1 belongs to access class 4, UE2 to access class 0, and UE3 to access class 0. Also assume that UE3 is in an emergency call. The eNB1 also stores this emergency call information and associates it with the UE3 and one of the UE3 bearers.

Figure 4:
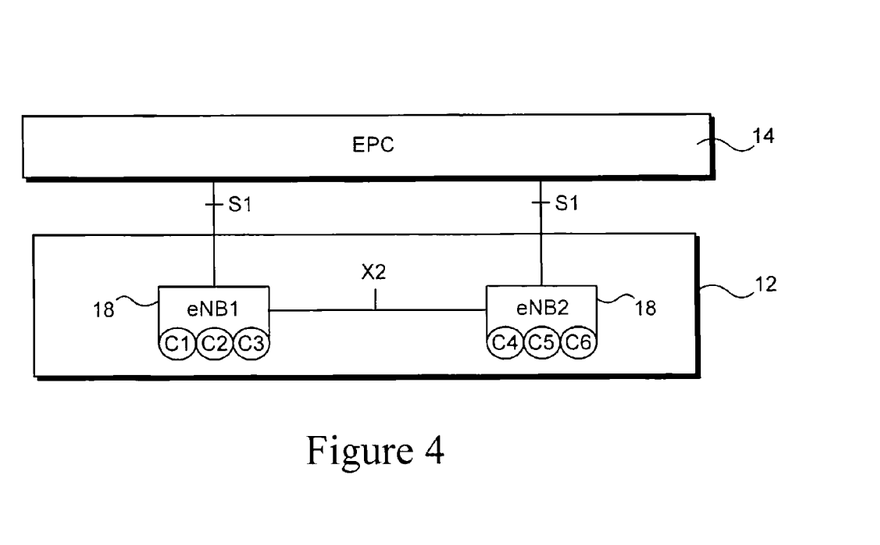
FIG. 4 is a simplified diagram of an LTE system showing an example of two eNodeBs each serving three cells, some of which are neighboring cells.

Assume that eNB2 broadcasts in cell C5 and that UE access class 0 is restricted. When that restriction decision is made, eNB2 sends a message to its neighboring nodes, in this case, eNB1, about this UE access class restriction by sending an X2 connection update message to eNB1. Alternatively, eNB2 may have decided that access class 0 is restricted before the X2 connection was established. In that case, eNB2 may send information that the access class 0 is restricted in cell C5 to eNB1 in an X2 connection setup message as explained in the example described later below, eNB1 stores for each neighbor cell with respect to eNB2's cells the information received in the X2 connection setup message. In this example, eNB1 stores that access class 0 is restricted in neighbor cell C5. For neighbor cell C4, eNB1 may not store any restricted access class information to indicate that no access class is restricted. Alternatively, eNB1 could store for cell C5 that access class 0 is restricted, access class 1 is not restricted, access class 2 is not restricted, . . . , access class 15 is not restricted. Similar information could be stored by eNB1 for cell C4 because it is a neighboring cell, but not for cell C6 which is not a neighbor cell. Other cell restriction state information may also be stored for each neighbor cell, e.g., whether the cell is barred, restricted for operator use, etc.

Assume that all three UEs in cell C3 are sitting in a car that moves toward cell C5 but also moves closer to cell C4. The eNB 1 wants to perform handover to cell C5 for all three UE connections. UE1 is not restricted because it does not belong to a restricted access class and can be handed over. UE2 is restricted because it belongs to access class 0, which is restricted. For UE2, the eNB1 might handover the UE2 connection to cell C4 if that cell has a high enough quality radio signal. UE3 is also allowed to be handed over to cell C5 because it is performing an emergency call and access class 10 is not restricted, even though its access class 0 is restricted. When UE3 is handed over to cell C5, the eNB1 also informs the eNB2 that UE3 is performing an emergency call in the handover preparation signaling. In LTE, that information may be provided over the X2 or S1 communication interfaces, depending on the type of handover. If, for example, the eNB1 receives information about area access restrictions from the MME indicating that UE3 is not allowed in the tracking area for cell C5, then this emergency call information nevertheless ensure handover of the UE3 connection to cell C5 is permitted. When UE1 and UE3 are handed over to cell C5, the eNB1 also informs the eNB2 that UE1 belongs to access class 4 and UE3 belongs to access class 0. If UE 2 is handed over to cell C4, then the eNB1 also informs the eNB2 that UE2 belongs to access class 0.

The X2 setup request and response messages typically contain information such as eNB identity and information of each cell served by the eNB such as the physical cell ID, the cell ID, the tracking area identity, PLMN IDs, and frequency. Including cell restriction state information in X2 setup and update messages is valuable in restricting and lifting restrictions regarding access to cells, avoiding unnecessary accesses to cells for which service is prohibited, ensuring that emergency calls are handled appropriately, and in steering handovers to appropriate cells.

Including cell restriction state information in X2 setup and update messages is particularly valuable when the cell restriction state for a cell changes from restricted to unrestricted either in general or for a particular access class(es). Consider the following example. Assume that cell C3 broadcasts a restriction that no (or extremely few) UEs may be handed over to cell C3. When the eNB1 starts (or decides) to broadcast this cell restriction in cell C3, it informs the eNB2 of this development by sending a message over the X2 interface. At some later point in time, the access restriction on cell C3 is removed. The question is how to communicate that new cell restriction state information to eNB2. One approach is for the eNB1 to wait for a UE handover request to come from the eNB2 in response to which eNB1 could inform eNB2 of the lifted restriction. But the problem is that there will never be any such handover request from eNB2 to eNB1 because the only neighbor cell C3 has been indicated as restricted and not allowed for handover or for any other type of radio link setup/addition. As a result, cell C3 will be empty of active UEs, and thus, it will take a long time until a UE is finally activated in cell C3 and initiates a handover to cell C4 or cell C5. When this occurs, the eNB1 could send information about the lifted access restriction to cell C3 and the handover request. But the delay until such a UE-specific message is sent is likely to be considerable, which means that significant network capacity is not utilized for that delay period.

Even worse, assume that cells C3, C4 and C5 are all restricted. In that case, it would not be possible for the eNB1 to send any requests message to the eNB2 to inform eNB2 when the access restriction for cell C3 has been removed. Nor can the eNB2 send any message to the eNB1, because the eNB2 has not been informed that the restriction regarding access for neighboring cell C3 has been removed. A deadlock has occurred. In this unfortunate situation, the operator might manually need to remove the stored restriction access information in eNB1 and eNB2 in order to break the deadlock.

The inventors recognized that these and similar situations could be avoided using a non-UE specific message, i.e., a global message not necessarily related to a specific UE, that includes information that the restricted status of a cell has changed. In the example, the eNB1 associated with the cell whose restricted access status has changed sends a global message to eNB2 and other eNBs with neighboring cells to inform them of the change in the restricted status of the cell. With this global non-UE specific message, any of the eNode Bs can be informed at any time or at any state about the fact that the cell restriction has been lifted thereby removing the objectionable delay noted above.

Figure 5:
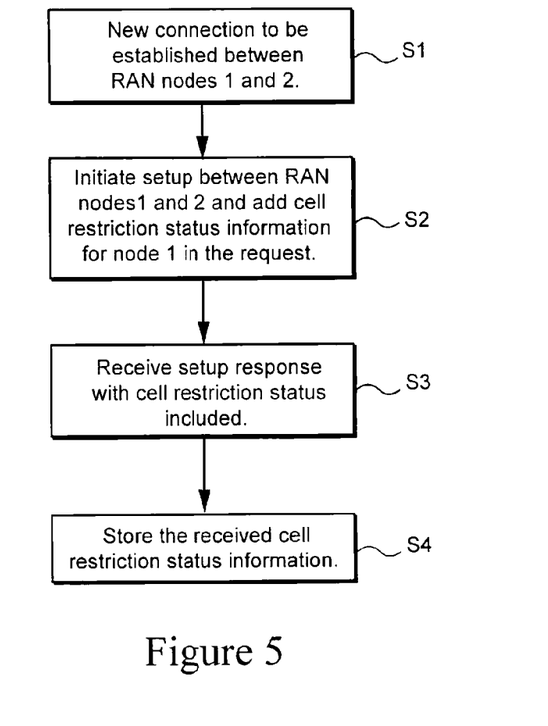
FIG. 5 is a flow chart diagram illustrating non-limiting, example procedures for a RAN node to set up a connection with another RAN node and communicate cell restriction status information.

Reference is now made to the flowchart diagram shown in FIG. 5 which illustrates non-limiting, example procedures associated with establishing a communications connection between two RAN nodes (step S1). In this example, the initial connection setup requests includes cell restriction status information for cells that are coordinated by RAN node 1 (step S2). RAN node 1 also receives a connection setup response from RAN node 2 which preferably also includes cell restriction status information for cells that are coordinated by RAN node 2 (step S3). Both RAN nodes then store that cell restriction status information for future use (step S4).

Figure 6:
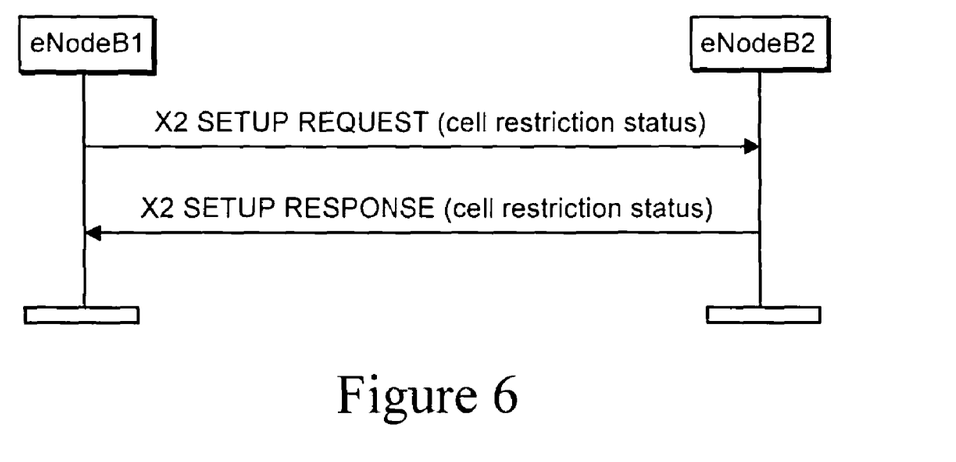
FIG. 6 shows a non-limiting example signaling diagram for the set up described in FIG. 5.

FIG. 6 illustrates an example signaling diagram in a non-limiting LTE context illustrating the procedures described in conjunction with FIG. 6. The eNB1 sends an X2 setup request message that includes cell restriction status information to eNB2. In response, eNB2 sends an X2 setup response message to eNB1 that includes its cell restriction status information.

Figure 7:
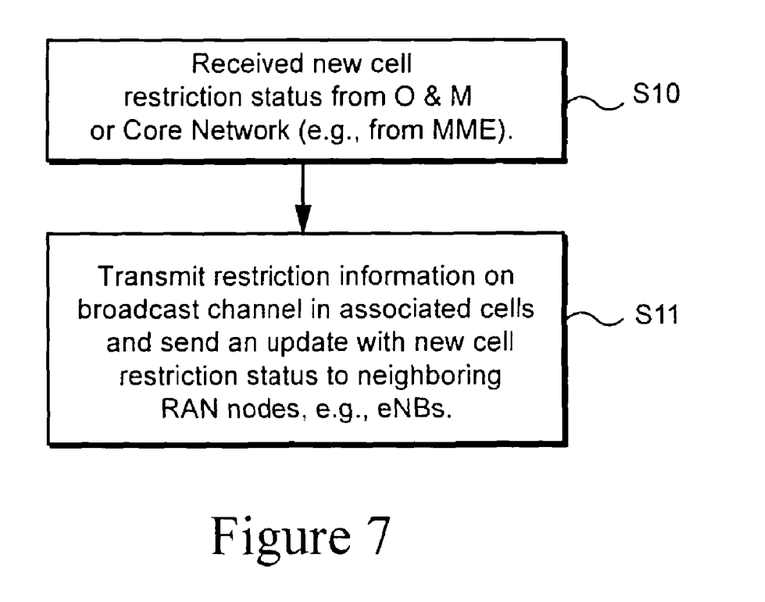
FIG. 7 is a flowchart diagram illustrating non-limiting, example procedures for receiving and providing new cell restriction status information.
Figure 8:
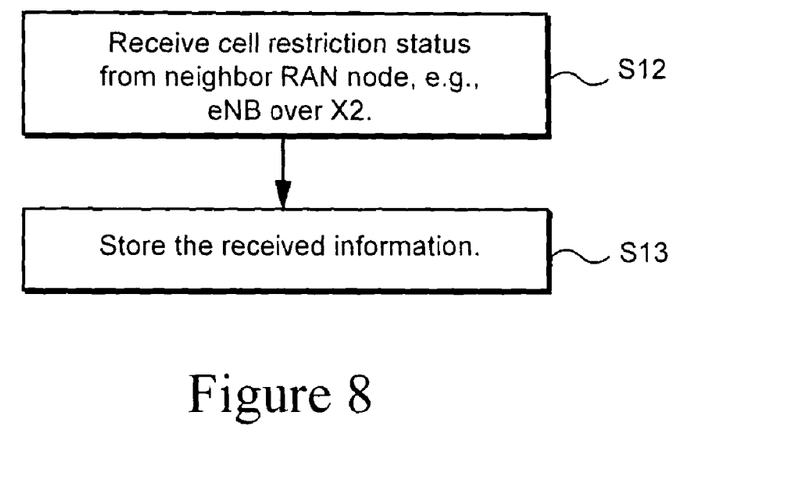
FIG. 8 is a flowchart diagram illustrating non-limiting, example procedures for receiving and storing cell restriction status information from a neighboring RAN node.
Figure 9:
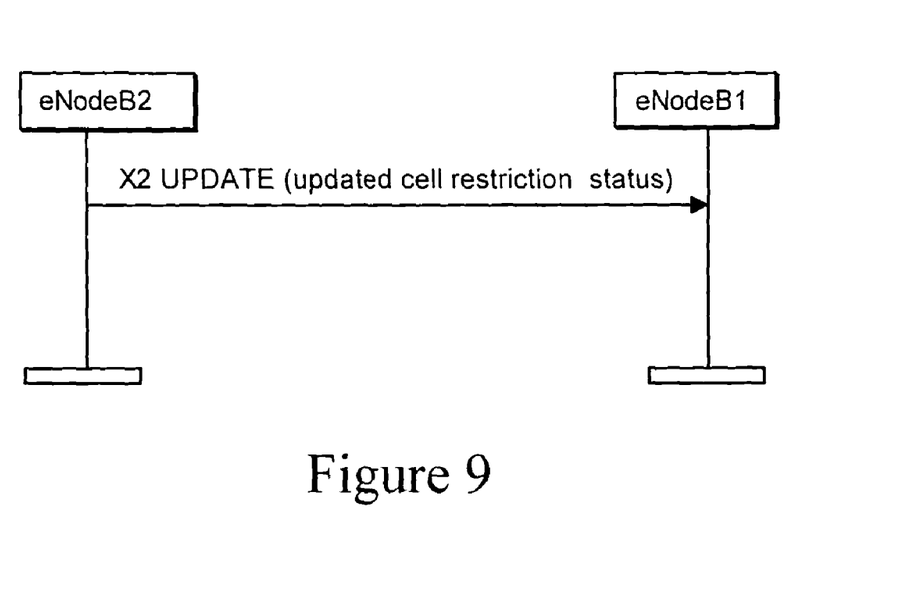
FIG. 9 is a non-limiting example signaling diagram for updating cell restriction status information between two RAN nodes.

The RAN nodes also should be able to update the status information for neighboring RAN nodes. Reference is made to the flowchart diagram in FIG. 7 where a RAN nodes receives new cell restriction status information from an operation and maintenance node or from a core network node, such as the MME in an LTE system (step S10). That cell restriction information is transmitted on a broadcast channel in associated cells and an update that includes the new cell restriction status information is sent to neighboring RAN nodes, which in an LTE context would be eNBs (step S11). The flowchart diagram in FIG. 8 illustrates steps performed by the receiving RAN node. Specifically, the RAN node receives cell restriction status information from a neighbor RAN node, which in a non-limiting LTE context would be received from a neighboring eNB over the X2 interface (step S12). The receiving RAN node then stores the received cell status restriction information for future use (step S13). FIG. 9 illustrates an example signaling diagram including an update message in a non-limiting LTE context. Here, the eNB2 sends an X2 update message with updated cell restriction status information to a neighboring eNB1.

Whenever a UE is handed over from the cell served by a first RAN node (the source RAN node) to a cell served by a second RAN node (the target RAN node) the source RAN adds information to the handover request or handover request acknowledgement message about UE access class restrictions and preferably also whether any of the connections/bearers being handed over is associated with an emergency call. Reference is made to the flowchart diagram in FIG. 10 that provides non-limiting example procedures for providing cell restriction status information in handover messages between RAN nodes. One or more UEs generate measurement reports regarding the radio link signal quality of signals received from currently serving and neighboring cells. The base station associated with the serving cell receives such UE measurement reports (step S20). A determination is made that a handover is required for an active connection for the UE that submitted a measurement report (step S21). The RAN node determines a target cell for possible handover (step S12). A decision is made by the source RAN node whether the target cell is restricted for this UE (step S23). In order to do that, the RAN node checks the cell restriction status information that has been stored for this UE, e.g. access class restriction information obtained from the UE context/SIM as described above. If the target cell is restricted, then the source RAN node determines another target cell for handover (step S22) rather than waste time and resources trying to handover to a cell for which access is not permitted. On the other hand, if the cell is not restricted for this UE, then the source RAN node prepares the handover and sends a handover request to the target RAN node that includes information associated with the UE's access class and preferably any emergency call indication for each connection/bearer (step S24).

Figure 10:
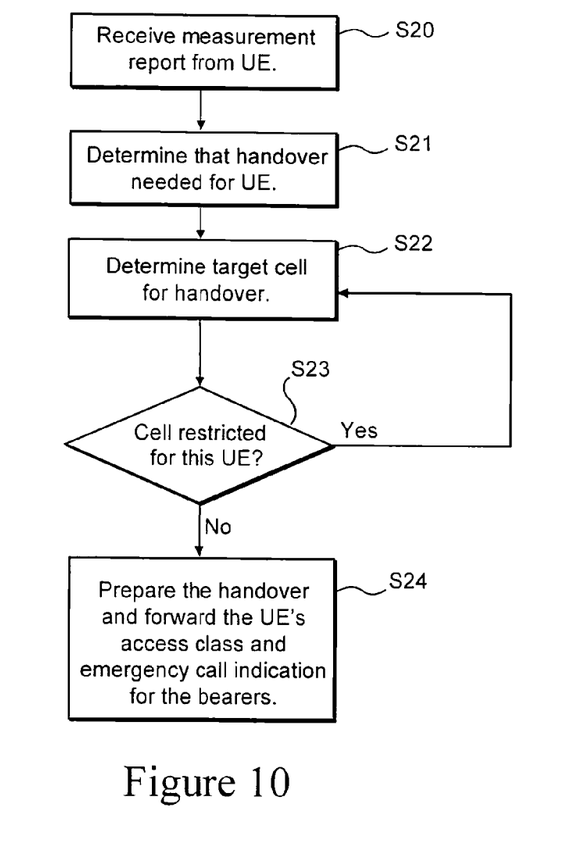
FIG. 10 is a flow chart diagram illustrating non-limiting, example procedures in which a handover is performed taking into account cell restriction status information and providing UE access class and emergency call information.
Figure 11:
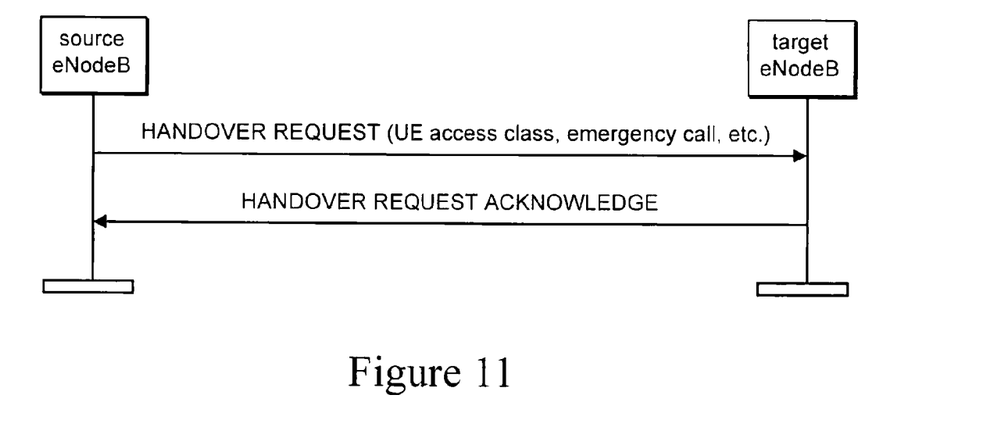
FIG. 11 is a non-limiting example signaling diagram associated with the procedures outlined in FIG. 10.

FIG. 11 shows a non-limiting example signaling diagram, a handover in accordance with the procedures of FIG. 10 in a non-limiting LTE context. The source eNB sends handover request with traditional handover information along with the UE access class (as stored on the SIM) and whether any of the connections contain an emergency call. This is independent of whether the handover is an X2 handover or an S1 handover. The target eNB sends a handover request acknowledge message back to the source eNB to confirm that target accepts the handover.

Figure 12:
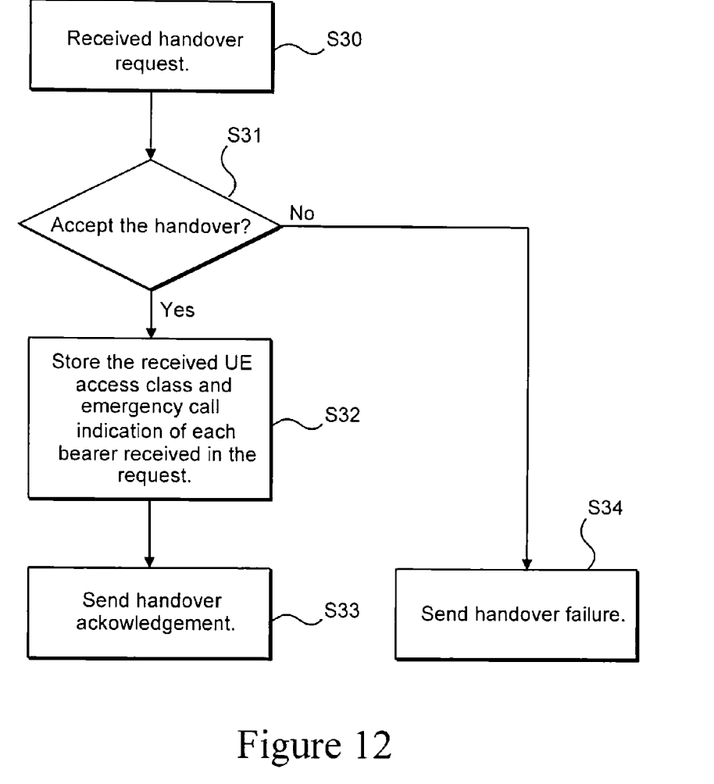
FIG. 12 is a flowchart diagram illustrating non-limiting, example procedures for receiving a handover request and storing access class and emergency call information as part of the handover messaging process.

FIG. 12 is a flowchart diagram illustrating non-limiting example procedures for receiving handover request information at a target RAN node. The target RAN node receives the handover request (step S30), and determines whether to accept the handover (step S31). If not, e.g., the UE connection does not have appropriate access to the target cell, the target RAN node sends a handover failure message back to the source RAN node and preferably includes a "rejection cause" such as for example "cell restricted", "cell restricted for operator use". "cell barred", and "cell access class restricted". If the handover can be accepted, then the target RAN node stores the received access class and emergency call information (step S32) and sends a handover acknowledgement (step S33).

Figure 13:
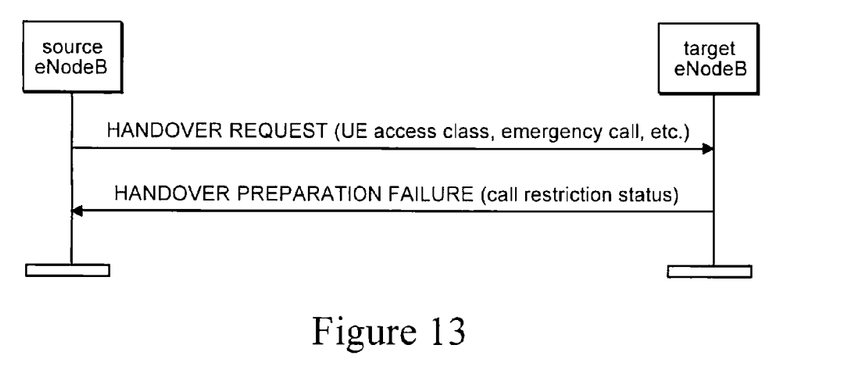
FIG. 13 is a non-limiting example signaling diagram associated with the procedures in FIG. 12.

FIG. 13 illustrates an example signaling diagram for the procedures described in conjunction with FIG. 12 in a non-limiting LTE context. A source eNB sends a handover request with cell restriction status information including the UE access class (as stored on the SIM) and emergency call information. The target eNB decides that the handover cannot be accepted and sends a handover preparation failure message back to the source eNB that preferably includes a "rejection cause" such as for example "cell restricted", "cell restricted for operator use", "cell barred", and "cell access class restricted".

Using the global, non-UE specific messaging technology described above offers many advantages, some of which are now described. First, any RAN node can be informed at any time or at any state about the fact that a cell restriction has been changed or lifted, which permits the receiving RAN node to store that changed cell restriction information without a potential deadlock situation occurring. Second, the global, non-UE specific message enables sending cell restriction information updates to neighboring RAN nodes without any delay. Third, these storing and immediate update features minimize handover failures, and as a consequence, minimize dropped calls at handover. Fourth, only a small amount of handover preparation signaling relating to the global, non-UE specific cell restriction message is needed. Fifth, a RAN node can be taken out of operation without causing handover failures which could cause automatic removal of cell relations in neighboring eNBs. Sixth, tests can be made in a RAN node without handover requests being performed from unknown UEs. Seventh, a RAN node can use the cell restriction status information, e.g., indicating cell barred, cell reserved for operator use, and access class barring information, to steer an idle mobile radio terminal to camp on the most appropriate frequencies or radio access technologies for best service. Eighth, that cell restriction status information also allows the RAN node to steer handover requests to most appropriate target cell. Ninth, a RAN node receiving the UE access classes of the UEs in the network can steer idle and active state UEs based on UE access class granularity. Tenth, by forwarding UE access class at handover, the target RAN node can use that UE access class information to steer handovers and steer cell camping based on its neighbor cells restriction status. Eleventh, forwarding of an emergency call indication at handover allows a target node to separate connections of emergency calls from connections of non-emergency calls. Twelfth, the emergency call indication may also be used to steer handovers based on neighbor cell restriction status and area restrictions.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method in a cellular radio communications network including a core network coupled to a radio access network (RAN) having multiple RAN nodes for communicating with mobile radio terminals, each of the multiple RAN nodes serving one or more cells, the method comprising:
   establishing that at least one cell associated with a first RAN node is in a restricted or reserved access state in which access to the one cell is restricted for at least some mobile radio terminals;
   sending, by the first RAN node, a message to a second RAN node to inform the second RAN node of that restricted access cell;
   determining that the restricted status of the one cell has changed;

generating a global message not related to a specific mobile terminal that includes information that the restricted status of the one cell has changed; and sending, by the first RAN node, the global message to the second RAN node to inform the second RAN node of the change in the restricted status of the one cell.

2. The method of claim 1, further comprising:

upon detecting that access in the at least one cell is to be restricted, sending, by the first RAN node, a global message to the second RAN node to inform the second RAN node of the restricted status of the one cell.

3. The method of claim 2, wherein at least some mobile radio terminals have an access class associated with accessing service via one or more cells in the cellular radio communications network, the method further comprising:

receiving and storing, at the first RAN node, information indicating the access class for at least one of the mobile radio terminals.

4. The method of claim 3, wherein the first RAN node uses the access class information in determining what cell or cells are available for access and handover of a connection involving one of the mobile radio terminals.

5. The method of claim 4, further comprising:

for a handover of a connection involving one of the at least some mobile radio terminals, forwarding, from the first RAN node corresponding to a source RAN node for the connection to the second RAN node corresponding to a target RAN node for the connection, information indicating the access class of the mobile radio terminal involved in the connection.

6. The method of claim 4, further comprising:

for a handover of a connection involving one of the at least some mobile radio terminals, forwarding, from the first RAN node corresponding to a source RAN node for the connection to the second RAN node corresponding to a target RAN node for the connection, information indicating whether the connection is an emergency call or includes an emergency bearer.

7. The method of claim 4, further comprising:

using access class status information to steer handover of a connection involving one of the mobile radio terminals to a handover target cell that uses a radio access technology different than the radio access technology used in a handover source cell.

8. The method of claim 4, further comprising:

using access class status information to steer an idle mobile radio terminal to camp on a cell based on an access class of the idle mobile radio terminal.

9. The method of claim 1, wherein the cellular radio communications network is a Long Term Evolution (LTE) type network and the first and second RAN nodes are enhanced Node Bs (eNBs).

10. The method of claim 1, wherein the cellular radio communications network is a Universal Mobile Telecommunications System (UMTS) type network and the first and second RAN nodes are Radio Network Controllers (RNCs).

11. A radio access network (RAN) node for use in a cellular radio communications network including a core network coupled to a radio access network (RAN) having multiple RAN nodes for communicating with mobile radio terminals, each of the multiple RAN nodes serving one or more cells, the RAN node comprising one or more circuits operative to:

establish that at least one cell associated with the RAN node is in a restricted or reserved access state in which access to the one cell is restricted for at least some mobile radio terminals;

send a message to another RAN node to inform the other RAN node of that restricted access cell;

determine that the restricted status of the one cell has changed;

generate a global message not related to a specific mobile terminal that includes information that the restricted status of the one cell has changed; and send the global message to the other RAN node to inform the other RAN node of the change in the restricted status of the one cell.

12. The RAN node of claim 11, the RAN node circuits being further operative to:

send a global message to the other RAN node to inform the other RAN node of the restricted status of the one cell upon detecting that access in the at least one cell is to be restricted.

13. The RAN node of claim 12, wherein at least some mobile radio terminals have an access class associated with accessing service via one or more cells in the cellular radio communications network, the RAN node circuits being further operative to receive and store information indicating the access class for at least one of the mobile radio terminals.

14. The RAN node of claim 13, wherein the RAN node circuits are operative to use the access class information in determining what cell or cells are available for access and handover of a connection involving one of the mobile radio terminals.

15. The RAN node of claim 14, wherein for a handover of a connection involving one of the at least some mobile radio terminals, the RAN node circuits are operative to forward to a target RAN node for the connection information indicating the access class of the mobile radio terminal involved in the connection.

16. The RAN node of claim 14, wherein for a handover of a connection involving one of the at least some mobile radio terminals, the RAN node circuits are operative to forward to a target RAN node for the connection information indicating whether the connection is an emergency call or includes an emergency bearer.

17. The RAN node of claim 14, wherein the RAN node circuits are operative to use access class status information to steer handover of a connection involving one of the mobile radio terminals to a handover target cell using a radio access technology different than the radio access technology used in a handover source cell.

18. The RAN node of claim 14, wherein the RAN node circuits are operative to use access class status information to steer an idle mobile radio terminal to camp on a cell based on an access class of the idle mobile radio terminal.

19. The RAN node of claim 11, wherein the cellular radio communications network is a Long Term Evolution (LTE) type network and the RAN nodes are enhanced Node Bs (eNBs).

20. The RAN node of claim 11, wherein the cellular radio communications network is a Universal Mobile Telecommunications System (UMTS) type network and the RAN nodes are Radio Network Controllers (RNCs).

* * * * *